June 7, 1955 H. W. KLAS 2,709,961
PARACHUTE RELEASE DEVICE
Filed March 19, 1951 2 Sheets-Sheet 1

INVENTOR.
HAROLD W. KLAS
BY
*G. D. O'Brien*
*R. M. Hicks* ATTYS.

June 7, 1955 H. W. KLAS 2,709,961
PARACHUTE RELEASE DEVICE
Filed March 19, 1951 2 Sheets-Sheet 2
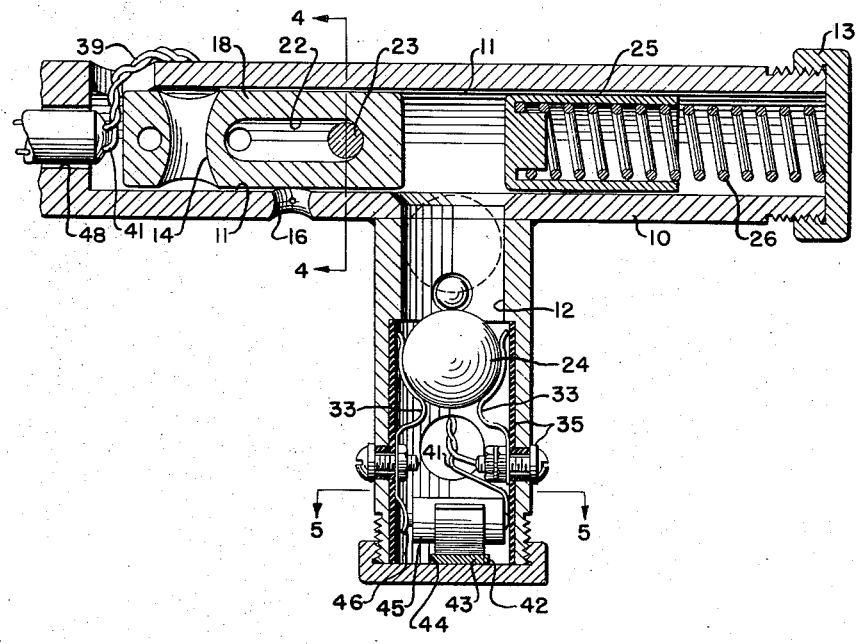
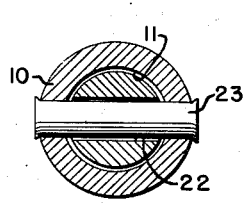
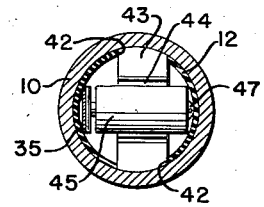
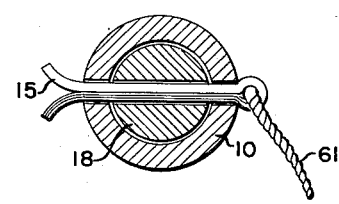
*INVENTOR.*
HAROLD W. KLAS
BY
*G. D. O'Brien*
*R. M. Hicks* ATTYS.

United States Patent Office 2,709,961
Patented June 7, 1955

2,709,961

PARACHUTE RELEASE DEVICE

Harold W. Klas, Sylvania, Ohio

Application March 19, 1951, Serial No. 216,450

10 Claims. (Cl. 102—4)

(Granted under Title 35, U. S. Code (1952), sec. 266)

This invention relates generally to an inertia responsive switch and more particularly to an inertia switch mechanism of a type suitable for use in closing a firing circuit for releasing a parachute from a load or for closing a firing circuit for detonating a parachute supported bomb, as the case may be, in response to the impact of the mine or bomb with the surface of the target area.

More specifically, the present invention contemplates the provision of an inertia switch of the foregoing character which moves an electroconducting mass from an initial unarmed position to an armed position in response to the deceleration caused by parachute opening, and thereafter moves the mass to a circuit closing position in response to the impact of the mine or bomb with the target.

The firing circuit for releasing a parachute from a mine generally includes a source of electrical energy, an electro-responsive detonator which is fired for releasing a locking means which connects the parachute to the mine, and an inertia responsive switch adapted to connect the detonator to the electrical source in response to the impact of the mine with the surface of the target area. A parachute release mechanism having a firing circuit adapted to accomplish the foregoing firing operation is disclosed and claimed in the copending application of Harold W. Klas, Serial No. 699,067, filed September 24, 1946, now Patent No. 2,686,025, for Parachute Releasing Means.

The inertia responsive switch employed in certain of the parachute release mechanisms heretofore devised comprises an inertia responsive electroconducting mass which is yieldably held by a spring urged detent out of engagement with a pair of terminals arranged in mutually spaced relation. When the switch is subjected to inertia forces such, for example, as the impact of the mine with the surface of a target area, the mass is adapted to be moved forcibly past the detent and bridge the terminals in response to the impact of the mine with the target surface. By reason of this arrangement, in event of extremely high inertia forces received by the switches the parachute opens, the inertia mass is subjected to a high deceleration which is liable to cause the mass to compress the springs and move into contact with the spaced terminals prematurely.

One object of the present invention is to provide an inertia switch for a parachute release mechanism which is effective to close a firing circuit for releasing a mine from a parachute in response to the impact of the mine with the surface of the target area in which means are provided for invariably preventing closure of the firing circuit in response to the inertia forces received thereby as the parachute opens.

Another object is to provide a new and improved inertia switch mechanism which is adapted to be operated in response to inertia forces resulting from parachute opening to move a mass from an initial unarmed position to an armed position, and thereafter to move the mass to circuit closing position in response to the impact of the load with the target area.

A still further object is to provide new and improved means for preventing operation of the inertia switch used in connection with the release of a parachute from the load until the parachute and load have been launched from an aircraft.

Other objects and many of the attendant advantages of this invention will be readily appreciated as the same becomes better understood by reference to the following detailed description when considered in connection with the accompanying drawings wherein:

Fig. 3 is a sectional view similar to Fig. 1 of a portion of the release mechanism and illustrating the position of the various parts when the load strikes the target surface;

Fig. 4 is a section taken along line 4—4 of Fig. 3;

Fig. 5 is a section taken along line 5—5 of Fig. 3; and

Fig. 6 is a section taken along line 6—6 of Fig. 1.

Figure 1:
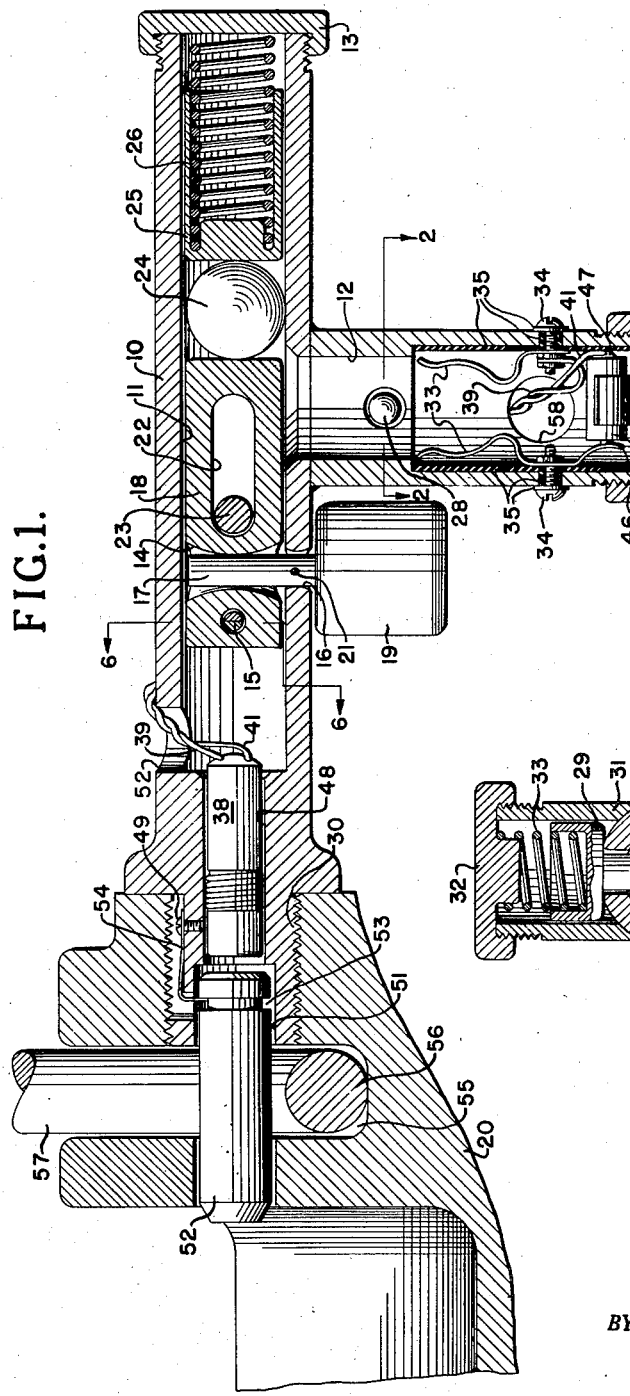
Fig. 1 is an elevational view partly in section of the release mechanism with the various parts arranged in the proper position prior to releasing the parachute from the aircraft.

Referring now to the accompanying drawings in which like numerals of reference are employed to designate like parts throughout the several views and more particularly to Fig. 1 there is shown thereon a T-shaped tubular housing 10 which is adapted to be rigidly secured to the mine or bomb support 20, as the case may be, by threading the parts together as at 30.

Housing 10 is formed with a horizontally arranged cylindrical opening 11 and an interconnected vertical opening 12. The outer end of opening 11 is closed by a cap 13 in threaded engagement with the end of the casing 10 to provide a seat for compression spring 26. The opposite end of compression spring 26 engages plunger 25 for urging the plunger 25, electroconducting ball 24, and plunger 18 toward the left as viewed in Fig. 1. Casing 10 is provided with a vertical opening 16 in which is slidably arranged shaft 17 disposed within a vertical bore 14 through plunger 18.

Shaft 17 has an integrally formed depending weight member 19 held suspended from the casing 10 by a shear pin 21 which is disposed within aligned bores through the shaft 17 and casing 10. The shear pin 21 is preferably formed of soft metal, and adapted to become severed in response to the shock of parachute opening at which time shaft 17 is withdrawn from bore 14 and opening 11 to fall free of the casing 10.

Piston 18 is provided with a longitudinal slot 22 therethrough in which is disposed a pin 23. Pin 23 is fitted in diametrically disposed openings through the casing 10 and held thereto by swedging over the ends of the pin as shown in Fig. 4.

Figure 2:
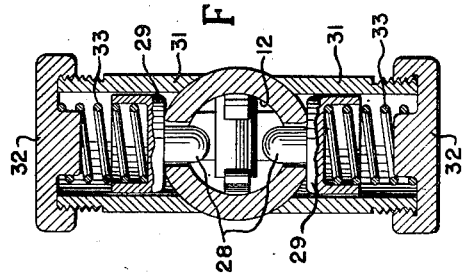
Fig. 2 is a sectional view taken along line 2—2 of Fig. 1.

The vertical portion of the casing 10 has secured thereto a pair of diametrically arranged tubular members 31, Fig. 2, the outer ends of which are closed by caps 32. Slidably arranged within each member 31 is a plunger 29 having an extension 28 projecting out into the opening 12. Disposed between the plungers 29 and the caps 32 are compression springs 33 for yieldably urging extensions 28 into the opening 12.

A pair of mutually spaced, resilient contact arms 33 are secured within the opening 12 and to the casing 10 by screws 34 which are electrically insulated from the casing by strips of insulating material 35 which are interposed between the contact arms 33, the screws 34 and the casing for preventing electrical leakage therebetween.

The insulating material 35 is provided with a pair of diametrically disposed slots 42 for receiving the base 43 of battery support 44. When assembling the parts together the battery support 44 holds the battery 45 within the opening 12 with terminal 46 of the battery in elecrical engagement with the left hand contact arm 33 as viewed in Figs. 1 and 3. The terminal 47 of battery 45 is soldered to conductor 41 for establishing an electrical connection to one terminal of an electroresponsive detonator 38 disposed within longitudinal bore 48 a conductor 39 establishes an electrical connection with the other terminal of the detonator 38 and the right hand contact arm 33 as viewed in Figs. 1 and 3. Conductors 39 and 41 are brought out through opening 57 and into opening 58 formed in casing 10. Bore 48 forms an interconnected passageway between the opening 11 and bore 51.

Slidably arranged within bore 51 is retaining pin 52 having a peripheral groove 53 formed therein for receiving the end of a yieldable retaining spring 54 which is secured to housing 10 by set screw 49.

The supporting member 20 is provided with a slotted portion 55 for receiving a U-shaped eye 56 of the eye bolt 57. The upper end of the eye bolt 57 is formed with integrally formed eye portions (not shown) for securing the shroud lines of the parachute in the well known manner.

When assembling the parts prior to releasing the device from the aircraft a cotter pin 15, Figs. 1 and 6, is inserted into aligned bores provided therefor through the casing 10 and plunger 18. The eye of cotter pin 15 has one end of a static line 61 secured thereto and the other end of the static line is secured to the aircraft structure whereby the cotter pin 15 is disengaged from the casing 10 and plunger 18 as the parachute and mine fall free of the aircraft.

When the inertia device is employed for releasing a parachute from a load as the load strikes the surface of a target area, the inertia switch controlled release mechanism operates in the following manner.

The release mechanism is assembled as shown in Fig. 1 and the load is rigidly secured to the load support 20. When the parachute and load are placed in the launching rack of the aircraft, static line 61 is secured to the eye of cotter pin 15 and to the aircraft structure whereby the cotter pin 15 is withdrawn from the casing 10 and plunger 18 as the load falls free of the aircraft. As the parachute snaps open, the falling speed of the load is rapidly decelerated which causes the weight member 19 to sever shear pin 21 whereby shaft 17 is withdrawn from bore 14 and opening 16 and falls free of the device. Compression spring 26 now moves plunger 25 to the left as viewed in Fig. 1 until the right hand end of slot 22 engages pin 23 thereby to allow the ball 24 to fall into the vertical opening 12 and come to rest on the detents or extensions 28.

As the load strikes the target surface, the force of impact is transmitted to the switch thereby causing the electroconducting ball 24 to depress plungers 29 sufficiently to move past extensions 28 and fall into gripping electrical engagement with contact arms 33 to complete the circuit from battery 45 to the detonator 38 and thereby to fire the detonator. As the detonator fires the locking pin 52 is forcibly ejected from bore 51 to release eye 57 and the parachute secured thereto from the load and its support 20.

It will be understood by those skilled in the art that, if desired, the inertia switch mechanism and the detonator 38 may be employed for detonating an anti-personnel shrapnel shell as the shell strikes the surface of the target area whereby it is rendered effective against land troops within the explosive area of the shell.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. An inertia actuated switch of the character disclosed for closing a circuit when a parachute supported load after release from an aircraft in flight strikes the surface of a target area comprising, a housing, a pair of mutually spaced terminals carried by said housing and adapted to close the circuit when the terminals are bridged, an electroconducting mass movably disposed within said housing, means for yieldably urging said mass from an initial retracted position to a moved position above said contacts, inertia controlled means for unlocking said mass in response to the sudden deceleration of the load as the parachute opens, and means for yieldably retaining said mass in said moved position until moved into bridging relation with respect to said terminals in response to the impact of the load with the target surface.

2. A switch of the character disclosed for closing a circuit as a parachute supported object after release from an aircraft in flight strikes the surface of a target area comprising, a housing for said switch rigidly secured to the object, said housing having a longitudinal passageway and a transverse passageway arranged in mutually intersecting relation therein, said longitudinal and transverse passageways being disposed substantially horizontally and vertically respectively during the descent of the parachute and object, an electroconducting mass arranged for movement within said passageways and initially positioned within said longitudinal passageway, at least one resilient supporting member extending within said transverse passageway at the upper end portion thereof and having sufficient tension to support the mass against the normal pull of gravity thereon, an inertia controlled device movable in response to sudden deceleration of the object when the parachute opens for locking said mass in an initial position within said longitudinal passageway until the inertia responsive device is moved, means for moving said mass when unlocked from said initial position to a moved position of rest on said supporting member, and a pair of terminals connected in said circuit and arranged in spaced relation with respect to each other at the lower portion of said vertical passageway for closing the circuit when the terminals are bridged by said mass as the mass forcibly moves past the supporting member in response to the impact of the object with the target surface.

3. A switch of the character disclosed for closing a circuit as a parachute supported load after release from an aircraft in flight strikes the surface of a target area comprising, a housing for said switch rigidly secured to the load, said housing having a pair of mutually intersecting passageways therein disposed horizontally and vertically respectively during the descent of the parachute and load, a pair of terminals arranged in spaced relation with respect to each other within the lower portion of the vertical passageway and connected in said circuit for closing the circuit when the terminals are bridged, a normally locked electroconducting mass arranged for movement within said passageways and initially positioned within the horizontal passageway, means for moving said mass when unlocked from said initial position into the upper portion of said vertical passageway, an inertia responsive device for unlocking said mass in response to the sudden deceleration of the object as the parachute opens, and means for yieldably supporting said mass in the upper portion of said vertical passageway until the mass is moved into bridging relation with respect to said terminals in response to the impact of the load with the target surface.

4. In a parachute release mechanism of the character disclosed for disconnecting a parachute from the load supported thereby, the combination of a control circuit including a pair of mutually spaced contacts, an initially locked mass for electrically bridging said contacts, said mass being movable from an initial position to an armed position above the contacts when the mass is unlocked, means for unlocking said mass in response to a first deceleration of the load as the parachute opens whereby said mass moves into the armed position above said contacts, and means for yieldably supporting the mass in said armed position, said mass being moved downwardly to bridge said contacts in response to a second deceleration upon the impact of the load with a target surface.

5. In a parachute release mechanism of the character disclosed for disconnecting a parachute from the load supported thereby, the combination of a control circuit including a pair of mutually spaced contacts, an electroconducting mass for electrically bridging said contacts, means for yieldably supporting said mass in an armed position above the contacts and out of engagement therewith until the mass is moved in response to the inertia force thereon due to impact of the load with a target surface, spring means for urging said mass from an initial locked position to said armed position, releasable means for locking said mass in said initial position against the opposing force of said spring means, and inertia responsive means movable in response to predetermined deceleration of the load for releasing said locking means as said inertia responsive means moves in response to sudden deceleration of the load as the parachute opens.

6. In a parachute release mechanism of the character disclosed for disconnecting a parachute from the load supported thereby, the combination of means including an electroresponsive device for disconnecting said load from said parachute as the electroresponsive device is operated, a control circuit for operating said device and including a pair of mutually spaced contacts for closing the circuit when the contacts are electrically bridged, an electroconducting mass movable in response to impact of the load with a target surface into electrically bridging engagement with said contacts from an armed position above the contacts, yieldable means for moving said mass from an initial safe position to said armed position, releasable means for locking said mass in said initial position against the opposing force of said yieldable means, and means responsive to the sudden deceleration of the load as the parachute opens for releasing said locking means.

7. An inertia switch of the character disclosed for closing a circuit as a parachute supported load after launching from an aircraft in flight strikes the surface of the earth comprising, a casing for said switch rigidly secured to said load, said casing having a first chamber and an interconnected second chamber formed therein and respectively disposed horizontally and vertically during the descent of the parachute and load, an electroconducting mass arranged for movement within said chambers and initially disposed within said first chamber, a piston slidably arranged within the first chamber in an initial position therein blocking said second chamber, a piston stop member arranged for limited movement of the piston from said initial position sufficient to clear said second chamber, an inertia responsive member for releasably locking said piston in said initial position and movable out of locking engagement therewith in response to the sudden deceleration of the load as the parachute opens, means for moving said mass into registry with said second chamber when said piston is released whereby the mass is moved in response to gravity into the upper portion of said second chamber, a pair of terminals spaced with respect to each other and arranged at the lower portion of said second chamber, said terminals being included in said circuit for closing the circuit when the terminals are bridged by said mass as the mass moves into engagement therewith, and at least one spring urged detent disposed within said second chamber above said terminals for preventing movement of said mass from the upper portion of said vertical chamber into bridging engagement with said terminals until the mass is forcibly moved past the detent in response to the impact of the load with the surface of the earth.

8. A switch of the character disclosed for closing a circuit as a parachute borne load strikes the surface of a target area comprising, a first cylindrical member rigidly secured to the load and having a bore therein, a second cylindrical member interconnecting the lower portion of the first member and having the respective bores thereof mutually intersecting, said bores of said first and second members being disposed substantially horizontally and vertically during descent of the parachute and load, an electroconducting mass adapted for movement within said bores and initially arranged within the bore of the first member, a piston slidably arranged within said bore of the first member and initially blocking the intersection between said members, an inertia responsive device arranged in releasable locking engagement with said piston and movable out of locking engagement therewith in response to the inertial forces thereon as the parachute opens, means for moving said mass along said bore of the first member and into said intersection when the piston is released, a pair of terminals arranged in mutually spaced relation at the lower portion of the bore of the second cylindrical member and included in said circuit for closing the circuit when the terminals are bridged by said mass as the mass moves to the lower portion of said bore of the second member, and yieldable means arranged in said bore of the second member and above said terminals for preventing movement of the mass from the upper portion of said member until the mass is forcibly moved past said last named means in response to the impact of the load with the target surface.

9. A mechanism of the character disclosed for releasing a parachute from a load as the load strikes the surface of the target area comprising, a first section secured to the load, a second section secured to the parachute, a rod slidably arranged within one of said sections and in locking engagement with the other of said sections for releasably locking the sections together, an electroresponsive detonator in substantial abutting spaced relation with respect to one end of said rod and adapted to eject the rod forcibly from locking engagement with said second section as the detonator is fired, a power source, a firing circuit connected to said power source and adapted to fire the detonator when the circuit is closed, a housing rigidly secured to said load, a pair of mutually spaced terminals arranged within said housing and adapted to close said firing circuit when the terminals are bridged, a normally locked electroconducting mass movable within said housing from an initially retracted position to a moved position above said terminals and out of engagement therewith when the mass is unlocked, means for unlocking said mass in response to the shock of parachute opening, means for moving said mass when unlocked to said moved position, and means for yieldably retaining said mass in said moved position and until the mass is moved into engagement with said terminals as the load strikes the surface of the target area.

10. In an aircraft launched mechanism of the character disclosed for releasing a load from a parachute upon impact of the load with the target surface, the combination of a support member secured to the load, a complementary member secured to the parachute, means for releasably locking said members together, an electroresponsive detonator associated with said locking means for forcibly moving said locking means out of locking engagement with said members as the detonator is fired, a normally open circuit for firing the detonator when the circuit is closed, a housing rigidly secured to said support member and having a longitudinally arranged passage and a lateral passage interconnected therewith and disposed vertically during descent of the parachute and load, a normally locked electroconducting mass movable within said passages and initially arranged within said longitudinal passage, a spring biased detent extending into the upper end of said vertical passage and having sufficient bias to support the mass against the normal pull of gravity thereon, means for moving said mass from said horizontal passage into said vertical passage to come to rest on said detent, an inertia responsive device for unlocking said mass in response to the impact of parachute opening, and a pair of mutually spaced terminals arranged at the lower end of said vertical passage and adapted to close said firing circuit when the terminals are bridged by said mass as the mass is forcibly moved past said detent in response to the impact of the load with the target surface.

References Cited in the file of this patent

UNITED STATES PATENTS

| | | |
|---|---|---|
| 1,442,345 | Kee | Jan. 16, 1923 |
| 2,161,082 | Outschinnikoff | June 6, 1939 |
| 2,441,133 | Brady | May 11, 1948 |